United States Patent
Fujimori (10) Patent No.: US 10,959,265 B2
(45) Date of Patent: Mar. 23, 2021

(54) COMMUNICATION APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Yuki Fujimori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 50 days.

(21) Appl. No.: 16/580,083

(22) Filed: Sep. 24, 2019

(65) Prior Publication Data

US 2020/0112990 A1 Apr. 9, 2020

(30) Foreign Application Priority Data

Oct. 3, 2018 (JP) .............................. JP2018-188611

(51) Int. Cl.
*H04W 4/00* (2018.01)
*H04W 74/08* (2009.01)
*H04W 72/12* (2009.01)
*H04W 74/00* (2009.01)
*H04W 84/12* (2009.01)

(52) U.S. Cl.
CPC ..... *H04W 74/0816* (2013.01); *H04W 72/121* (2013.01); *H04W 72/1278* (2013.01); *H04W 74/002* (2013.01); *H04W 84/12* (2013.01)

(58) Field of Classification Search
CPC ............... H04W 84/12; H04W 72/121; H04W 72/1278; H04W 74/002; H04W 74/0816
See application file for complete search history.

(56) References Cited

U.S. PATENT DOCUMENTS

2017/0279568 A1 9/2017 Huang

*Primary Examiner* — Bo Hui A Zhu
(74) *Attorney, Agent, or Firm* — Rossi, Kimms & McDowell LLP

(57) ABSTRACT

A communication apparatus compatible with an IEEE 802.11ax standard that enables multi-user communication in which signals for one or more other communication apparatuses are multiplexed and transmitted, the communication apparatus determines, in a case where the multi-user communication is uplink communication, whether an incompatible apparatus exists around the communication apparatus, the incompatible apparatus being compatible with any of standards of an IEEE 802.11 series that precede the IEEE 802.11ax standard and incompatible with the IEEE802.11ax standard, and transmits, in a case where it is determined that the incompatible apparatus exists around the communication apparatus, an MU-RTS (Multi User Request To Send) frame before data communication through the multi-user communication.

12 Claims, 7 Drawing Sheets

COMMUNICATION APPARATUS, CONTROL METHOD, AND NON-TRANSITORY COMPUTER-READABLE STORAGE MEDIUM

BACKGROUND OF THE INVENTION

Field of the Invention

The present invention relates to an interference control technique for wireless communication.

Description of the Related Art

Information that is transmitted and received through wireless communication is becoming increasingly advanced from text data to image data, and from image data to moving image data, and its communication amount is also increasing. Meanwhile, as there is a limit to frequency bands that can be used in wireless communication, there is demand to be able to improve the efficiency of frequency usage by densely multiplexing signals in a variety of dimensions, such as time, frequency, code, and space, and increasing the communication capacity.

With such a background, in a wireless LAN (Local Area Network), there has been an attempt to increase the communication capacity by introducing such methods as advanced multivalued modulation methods, channel bonding, and MIMO (Multiple-Input and Multiple-Output). For example, the IEEE (the Institute of Electrical and Electronics Engineers of the United States) has considered the IEEE 802.11ax as a high-efficiency (HE) next-generation wireless LAN standard. In order to improve the efficiency of frequency usage, the IEEE 802.11ax proposes to use OFDMA in which a frequency channel structure that has been conventionally used in units of 20-MHz frequency bandwidth can be allocated to a plurality of terminals in units of smaller frequency bandwidth. Note that OFDMA is an acronym for Orthogonal Frequency Division Multiple Access, and is a multi-user (MU) communication method that multiplexes signals of a plurality of users.

According to the IEEE 802.11ax, OFDMA allocates at least a part of a frequency band having a width of 20 MHz to up to nine users. When the number of users is one, the entire frequency band having the width of 20 MHz may be allocated to this user; on the other hand, when the number of users is two or more, parts of the frequency band having the width of 20 MHz, which do not overlap with one another, are respectively allocated to the users. Similarly, when frequency bands having widths of 40 MHz, 80 MHz, and 160 MHz are used, at least a part of such frequency bands is allocated to up to 18, 37, and 74 users, respectively.

In an MU communication method according to OFDMA that has been considered by the IEEE 802.11ax, the subcarrier spacing is changed from 312.5 kHz, which has been used by OFDM of the IEEE 802.11a/g/n/ac, which are the conventional standards, to 78.125 kHz. Note that, for this reason, a wireless LAN device compatible with the standards of the IEEE 802.11 series that precede the IEEE 802.11ax standard (hereinafter referred to as a "legacy device") basically cannot demodulate a signal that is communicated using the MU communication method of the IEEE 802.11ax. On the other hand, a wireless LAN device compatible with the IEEE 802.11ax (hereinafter referred to as an "HE device") is configured to be capable of demodulating a signal communicated by a legacy device and transmitting a signal that can be demodulated by a legacy device.

Between legacy devices, in order to avoid communication interference, a transmitting apparatus can transmit an RTS (Request To Send) frame and a receiving apparatus can transmit a CTS (Clear To Send) frame. These RTS and CTS include an NAV (Network Allocation Vector, so-called transmission prohibition period) as information of a period in which a channel is expected to be occupied against nearby wireless LAN devices. When another wireless LAN device that exists around the transmitting apparatus that transmitted the RTS frame and the receiving apparatus that transmitted the CTS frame has received the RTS frame or the CTS frame, the wireless LAN device refrains from transmitting a signal during the NAV period of which it has been notified. As an HE device can correctly demodulate a signal transmitted by a legacy device, the HE device does not transmit a signal during the NAV period. In this way, another wireless LAN device that exists around the transmitting apparatus that transmitted the RTS frame and the receiving apparatus that transmitted the CTS frame does not transmit a signal whether it is a legacy device or an HE device; thus, interference with a signal transmitted by the transmitting apparatus is suppressed. Note that, in communication between legacy devices, the RTS frame issued by the transmitting apparatus and the CTS frame issued by the receiving apparatus are not simultaneously transmitted by a plurality of devices within the same channel.

On the other hand, according to the IEEE 802.11ax, in order to adapt an RTS frame and a CTS frame to the MU communication method, a combination of an MU-RTS (Multi User RTS) frame and a simultaneous CTS responses frame is used (the Specification of US-2017-0279568). Specifically, an access point (AP) transmits the MU-RTS frame. The MU-RTS frame is transmitted in an HT PPDU (PLCP (Physical Layer Convergence Protocol) Protocol Data Unit) format that can be demodulated by a legacy device compatible with HT (High Throughput) (a wireless LAN device of or after 802.11n), or in a non-HT PPDU or non-HT Duplicate PPDU format that can be demodulated by all legacy devices. A legacy device that can demodulate the MU-RTS frame can update an NAV using the value of a Duration Field included in this frame. Each terminal that performs MU communication simultaneously transmits a CTS frame of the same content in response to the MU-RTS from the AP. As each terminal transmits the CTS frame, a terminal that can receive this CTS frame can appropriately set an NAV even if it cannot receive the MU-RTS frame from the AP. Note that this CTS frame is transmitted in a format that can be demodulated even by a legacy device.

As MU-RTS/CTS processing creates an overhead in data communication, performing the MU-RTS/CTS processing during every MU communication will reduce the efficiency of band usage. Meanwhile, when the MU-RTS/CTS processing is not performed, there is a problem of interference of transmission packets due to the influence of a legacy device and a hidden terminal.

SUMMARY OF THE INVENTION

The present invention has been made in view of the aforementioned problems, and provides a technique to efficiently perform interference suppression control in multi-user communication.

According to one aspect of the present invention, there is provided a communication apparatus compatible with an IEEE 802.11ax standard that enables multi-user communication in which signals for one or more other communication apparatuses are multiplexed and transmitted, the comprises: a determination unit configured to, in a case where the multi-user communication is uplink communication, determine whether an incompatible apparatus exists around the communication apparatus, the incompatible apparatus being compatible with any of standards of an IEEE 802.11 series that precede the IEEE 802.11ax standard and incompatible with the IEEE802.11ax standard; and a transmission unit configured to, in a case where the determination unit has determined that the incompatible apparatus exists around the communication apparatus, transmit an MU-RTS (Multi User Request To Send) frame before data communication through the multi-user communication.

Further features of the present invention will become apparent from the following description of exemplary embodiments (with reference to the attached drawings).

DESCRIPTION OF THE EMBODIMENTS

With reference to the attached drawings, the following describes the present invention in detail based on examples of its embodiments. Note that the configurations indicated by the following embodiments are merely examples, and the present invention is not limited to the illustrated configurations.

[Network Configuration]

Figure 1:
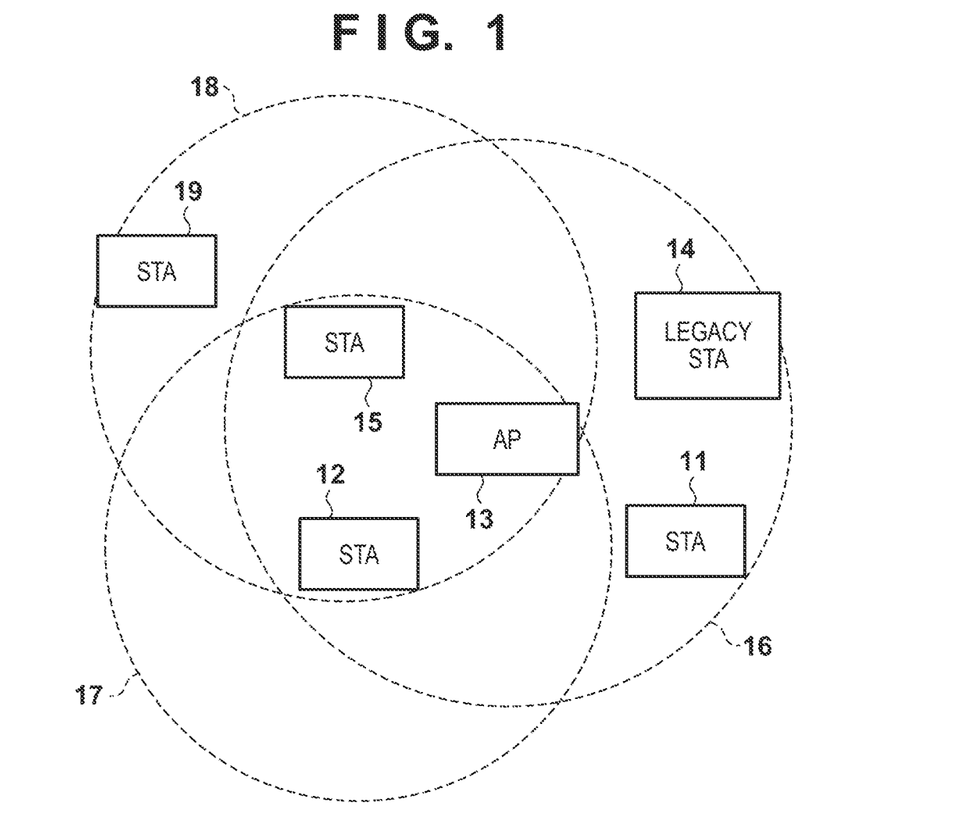
FIG. 1 shows an exemplary network configuration according to embodiments.

FIG. 1 shows an exemplary configuration of a network according to some embodiments that will be described later. FIG. 1 shows a configuration including three stations (STA 11, STA 12, STA 15) as HE devices, one access point (AP 13), a legacy STA 14, and an STA 19 (this may be either an HE device or a legacy device). Although the legacy STA 14 is illustrated as an STA in FIG. 1, it may be either an AP or an STA as long as it is a legacy device. As shown in FIG. 1, a range in which a signal transmitted by the AP 13 can be received is indicated by a circle 16; a signal transmitted by the AP13 can be received by the STA 11, STA 12, legacy STA 14, and STA 15. Also, a range in which a signal transmitted by the STA 12 can be received is indicated by a circle 17; it is assumed that a signal transmitted by the STA 12 can be received by the AP 13 but cannot be received by the legacy STA 14. Similarly, a range in which a signal transmitted by the STA 15 can be received is indicated by a circle 18; it is assumed that a signal transmitted by the STA 15 can be received by the AP 13, STA 19 but cannot be received by the legacy STA 14. Although not illustrated, it is assumed that a signal transmitted by the legacy STA 14 can be received by the AP 13. Note that the foregoing is an example, and the following discussion is applicable to, for example, a network including a large number of HE devices and legacy devices across a large area, and also to positional relationships among a variety of communication apparatuses.

In the example of FIG. 1, two STAs (STA 12 and STA 15) perform MU communication (multi-user communication) with the AP 13. In order to perform the MU communication, the AP 13 can transmit an MU-RTS (MU Request To Send) frame. In response to the received MU RTS frame, the STA 12 and STA 15 can transmit a simultaneous CTS (Simultaneous Clear To Send) frame (hereinafter, a CTS frame). Note that the MU RTS frame includes information designating STAs that should transmit a CTS frame in response to that MU RTS frame, and information designating a frequency using which the CTS frame should be transmitted. Therefore, the STA 12 and STA 15 can transmit the CTS frame using the designated frequency when they are designated in the MU RTS frame as the STAs that should transmit the CTS frame. Here, although the STA 11 can receive the MU RTS frame, it does not transmit the CTS frame because information of itself is not included in the information designating the STAs that should transmit the CTS frame.

The MU-RTS frame is transmitted in an HT PPDU, a non-HT PPDU, or a non-HT Duplicate PPDU format. The MU-RTS frame that has been transmitted in the HT PPDU format can be demodulated by a legacy device compatible with HT (a wireless LAN device of or after 802.11n). The MU-RTS frame that has been transmitted in the non-HT PPDU or non-HT Duplicate PPDU format can be demodulated by every legacy device. A legacy device that can demodulate the MU-RTS frame can update an NAV using the value of a Duration Field included in the MU-RTS frame. In the example of FIG. 1, the STA 19 cannot directly receive a signal from the AP 13. However, as the STA 19 can receive the CTS frames transmitted by the STA 12 and STA 15, it can appropriately set the NAV using the value of the Duration Field included in the CTS frame. A corresponding MU communication period is set as an NAV period, and each STA does not perform data transmission during that period, thereby suppressing signal interference. In the case of an uplink, the MU communication period is a period until a Trigger frame (a frame for controlling uplink transmission), a UL PPDU (an uplink PPDU in multi-user communication), and an MU-ACK frame. The UL PPDU is, for example, a UL HE MU PPDU (Uplink High efficiency Multi-user physical layer (PHY) protocol data unit).

Meanwhile, as MU-RTS/CTS processing creates an overhead in data communication as stated earlier, performing the MU-RTS/CTS processing during every MU UL communication will reduce the efficiency of band usage. Some embodiments that will be described later discuss processing for switching between the execution and non-execution of MU-RTS transmission in accordance with information of STAs that exist around an AP.

Figure 2:
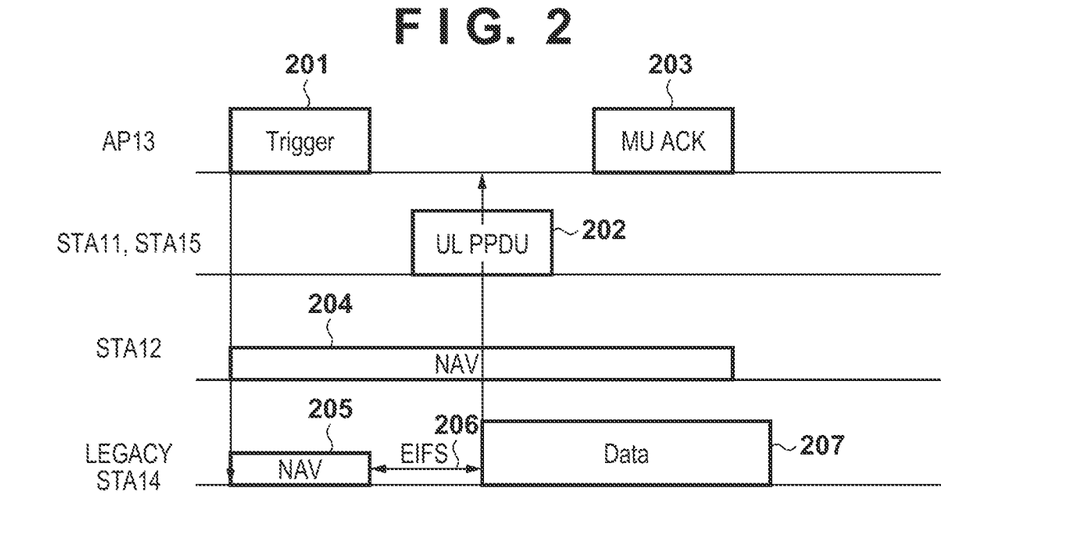
FIG. 2 shows a time chart for a case where UL MU communication is executed without MU-RTS transmission.

Before starting the description of embodiments, a description will be given of the problem of signal interference caused by non-transmission of MU-RTS when a legacy device exists around an AP with reference to FIG. 2. FIG. 2 shows a time chart for a case where UL MU communication is executed without MU-RTS transmission. It is assumed that the AP 13, STA 11, STA 12, legacy STA 14, and STA 15 in FIG. 2 are respectively arranged as shown in FIG. 1.

The AP 13 first transmits a Trigger frame 201 for starting the UL MU communication in an HE PPDU format. The STA 11, STA 12, and STA 15 can receive the Trigger frame 201 as they exist in a range that is reached by a signal of the AP 13. The STA 11 and STA 15 receive the Trigger frame 201, confirm that information of themselves as STAs is included in a PerUserInfo field included in this frame, and prepare for the subsequent UL MU communication. On the other hand, the STA 12 confirms that information of itself as an STA is not included, and sets an NAV period 204 based on the value included in a Duration Field. Due to this setting of the NAV period 204, interference suppression becomes effective with respect to the STA 12 for a period including the subsequent UL PPDU 202 and MU-ACK 203, similarly to the setting of the NAV with respect to the MU-RTS.

Meanwhile, the legacy STA 14, which is a legacy device, cannot demodulate the Trigger frame 201 in the HE PPDU format, and cannot learn about the Duration Field. However, the Trigger frame 201 in the HE PPDU format has an L-SIG field for compatibility with a legacy device, and an L-SIG LENGTH field included in this frame includes size information of the Trigger frame 201. Therefore, using this size information, the legacy STA 14 can set an NAV period 205 as a transmission period of the Trigger frame 201. Upon expiration of the NAV period 205, the legacy STA 14 regards the Trigger frame 201 as an error frame, and becomes capable of transmitting data 207 after a back-off period following an EIFS (Extended Interframe Space) 206. There is a possibility that the transmission of this data 207 interferes with the UL PPDU 202.

As described above, in UL MU communication, how interference suppression works varies depending on whether a legacy device exists. That is to say, when no legacy device exists, a Trigger frame enables interference suppression in a period including the subsequent MU communication without transmitting an MU-RTS; however, when a legacy device exists, such interference suppression is impossible. The embodiments that will be described later discuss processing in which, during MU UL communication, an MU-RTS is transmitted when a legacy device exists around an AP, and the MU-RTS is not transmitted when no legacy device exists around the AP.

[Configuration of AP]

Figure 3:
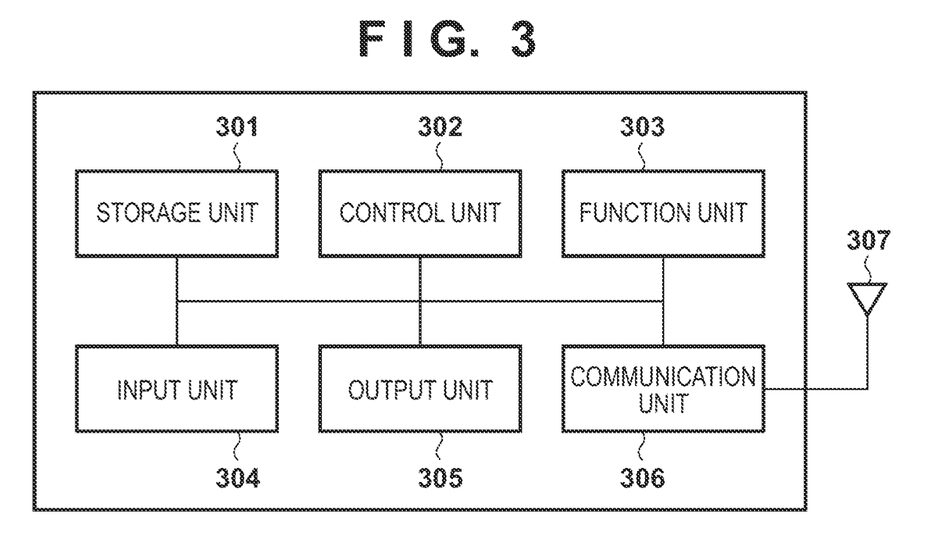
FIG. 3 shows an exemplary hardware configuration of an AP according to embodiments.

FIG. 3 shows an exemplary hardware configuration of the AP 13 according to some embodiments that will be described later. The AP 13 includes, in one example of its hardware configuration, a storage unit 301 a control unit 302, a function unit 303, an input unit 304, an output unit 305, a communication unit 306, and an antenna 307.

The storage unit 301 is composed of one or both of a ROM and a RAM, and stores programs for performing various types of operations, which will be described later, and various types of information, such as communication parameters for wireless communication. Note that, other than memories like a ROM and a RAM, a storage medium like a flexible disk, a hard disk, an optical disc, a magneto-optical disc, a CD-ROM, a CD-R, a magnetic tape, a nonvolatile memory card, or a DVD may be used as the storage unit 301.

The control unit 302 is composed of, for example, a processor, such as a CPU and an MPU, an ASIC (application-specific integrated circuit), a DSP (digital signal processor), an FPGA (field-programmable gate array), and so forth. Here, the CPU is an acronym for Central Processing Unit, and the MPU is an acronym for Micro Processing Unit. The control unit 302 controls the entire AP 13 by executing programs stored in the storage unit 301. Note that the control unit 302 may control the entire AP 13 through coordination between programs stored in the storage unit 301 and an OS (Operating System).

Furthermore, the control unit 302 executes predetermined processing, such as image capturing, printing, and projection, by controlling the function unit 303. The function unit 303 is hardware that is intended for the execution of predetermined processing by the AP 13. For example, when the AP 13 is a camera, the function unit 303 is an image capturing unit and performs image capturing processing. Also, for example, when the AP 13 is a printer, the function unit 303 is a printing unit and performs printing processing. Also, for example, when the AP 13 is a projector, the function unit 303 is a projection unit and performs projection processing. Data processed by the function unit 303 may be data that is stored in the storage unit 301, or may be data that has been communicated to/from another device via the communication unit 306, which will be described later.

The input unit 304 accepts various types of operations from a user. The output unit 305 performs various types of output to the user. Here, the output performed by the output unit 305 includes at least one of display on a screen, audio output through a speaker, vibrational output, and so forth. Note that both of the input unit 304 and the output unit 305 may be realized using one module, as with a touchscreen.

The communication unit 306 executes communication processing. The communication unit 306 can execute at least communication processing compliant with the IEEE 802.11ax standard. The communication unit 306 also transmits and receives a wireless signal for wireless communication by controlling the antenna 307. The AP 13 communicates contents, such as image data, document data, and video data, with another communication apparatus via the communication unit 306.

Figure 4:
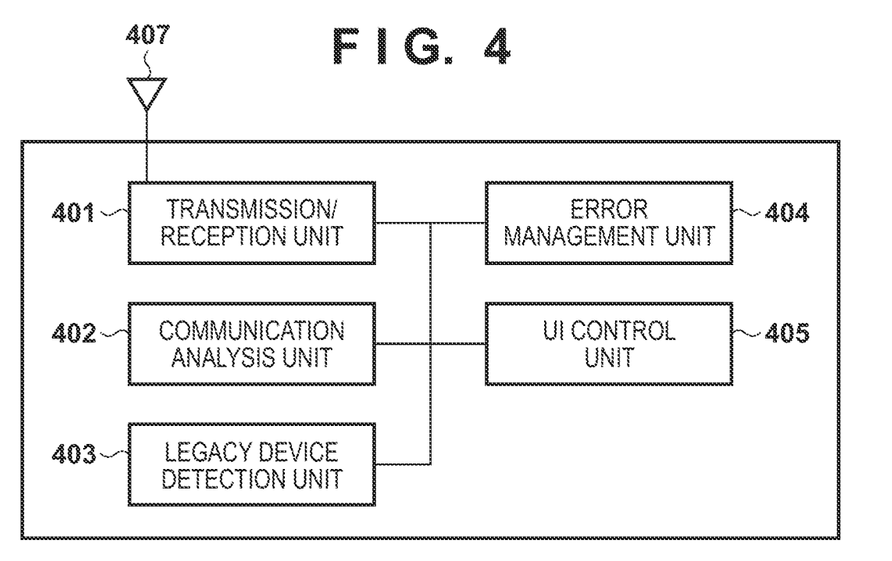
FIG. 4 shows an exemplary functional configuration of the AP according to embodiments.

FIG. 4 shows an exemplary functional configuration of the AP 13 according to some embodiments that will be described later. The AP 13 includes, in one example of its functional configuration, a transmission/reception unit 401, a communication analysis unit 402, a legacy device detection unit 403, an error management unit 404, and a UI control unit 405.

The transmission/reception unit 401 transmits and receives a signal by controlling the communication unit 306 (FIG. 3). For example, the transmission/reception unit 401 transmits an MU-RTS frame using a designated frequency channel. Note that the transmission/reception unit 401 may transmit the MU-RTS frame in the HT PPDU format, or may transmit the same in the non-HT PPDU format. Furthermore, when the legacy device detection unit 403 has determined that a legacy device exists, control may be performed to transmit the MU-RTS frame in the non-HT PPDU format; however, no limitation is intended by this. The communication analysis unit 402 analyzes the content of communication with an opposing device. The legacy device detection unit 403 detects whether a legacy device exists via a frequency band used in MU communication. For example, upon detecting a Management frame that has been transmitted from another device via at least a part of this frequency band within a certain period, the legacy device detection unit 403 determines whether this frame includes an HE Capabilities Element. A Management frame transmitted by a legacy device does not include an HE Capabilities Element. Therefore, the legacy device detection unit 403 can regard a device that has transmitted a Management frame that does not include an HE Capabilities Element as a legacy device. Note that a legacy device may be an AP or a non-AP STA, and may belong to the same BSS (Basic Service Set)

as the AP 13 or may belong to another BSS. In addition, the legacy device detection unit 403 may determine whether a legacy device is a legacy device compatible with HT or a legacy device incompatible with HT depending on whether a Management frame transmitted by another device includes an HT (High Throughput) Capabilities Element. If a Management frame includes an HT Capabilities Element, the legacy device detection unit 403 determines that the device that has transmitted this frame is a legacy device compatible with HT.

The error management unit 404 manages the number of times MU communication resulted in an error without succeeding, and the number of consecutive errors. As an error determination method, it can be determined that an error has occurred when a UL PPDU (data packet) from a target STA in UL MU is not received. For example, when the reception of a UL PPDU from a specific STA has failed n times, which is a predetermined number (e.g., n=3), consecutively (when the number of errors has exceeded the predetermined number), it may be determined that UL MU communication with this STA is in an error state. The UI control unit 405 is configured to include hardware related to user interfaces, such as a touchscreen and buttons, for accepting an operation that has been performed by a non-illustrated user of the AP 13 with respect to the AP 13, and programs for controlling them.

[Flow of Processing of AP]

Figure 5:
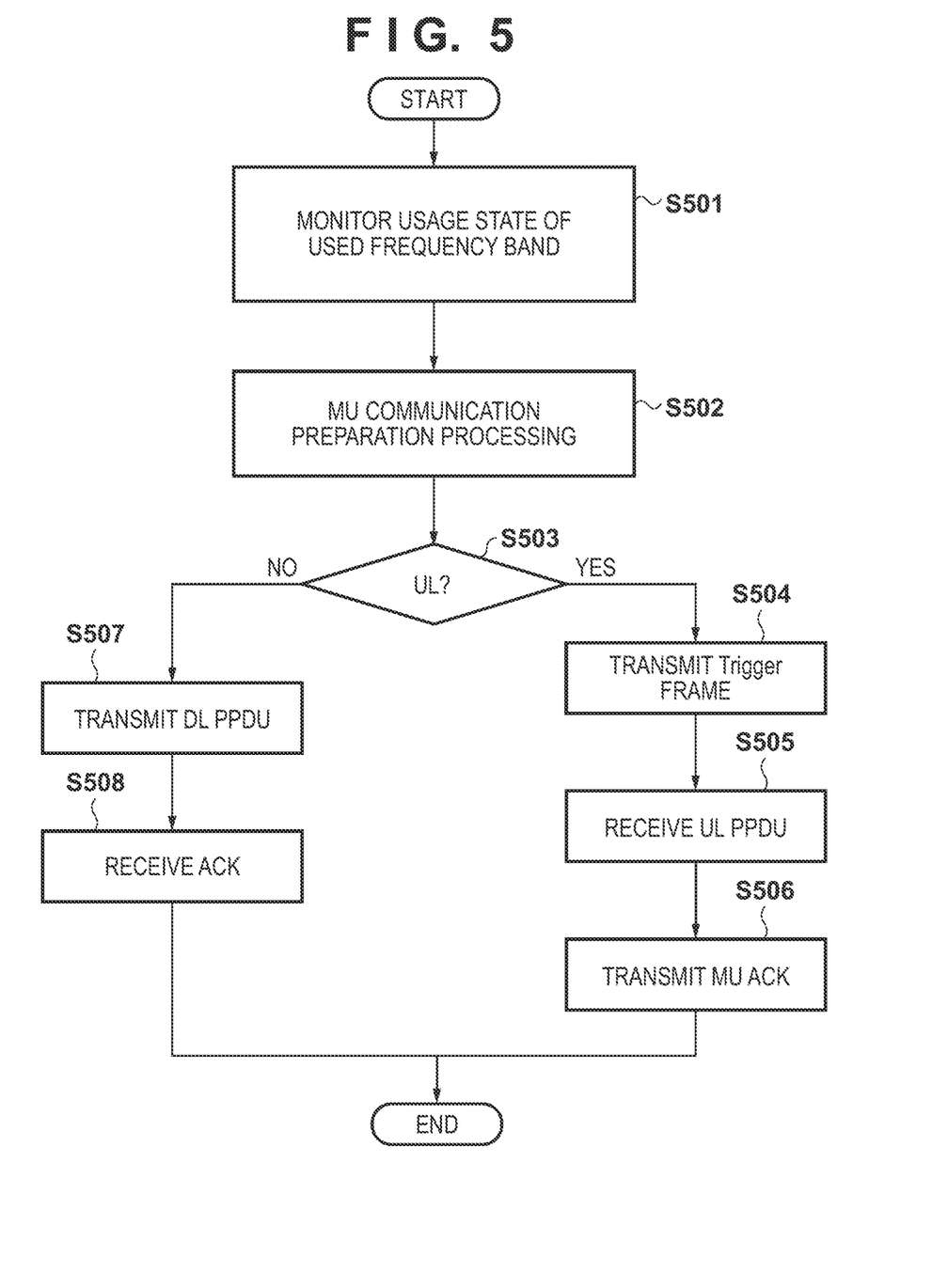
FIG. 5 shows an example of the flow of MU communication processing that is executed by the AP in embodiments.

Next, a description will be given of the flow of processing executed by the AP 13 in some embodiments that will be described later. FIG. 5 is a flowchart showing an example of the flow of processing in which the AP 13 according to the embodiments executes MU communication. The present processing is realized by, for example, the control unit 302 of the AP 13 executing a program stored in the storage unit 301. It is assumed here that STAs (the STA 12 and STA 15 in the example of FIG. 1) are connected to the AP 13 using an MU communication method.

In the present processing, the AP 13 first monitors the usage state of frequency channels within a predetermined frequency band used for the MU communication, for example, on a regular basis (step S501). Note that monitoring of the usage state of frequency channels within the predetermined frequency band is started upon, for example, establishment of a BSS by the AP 13. In this monitoring, the legacy device detection unit 403 determines whether a legacy device exists around the AP 13. Note that this monitoring processing may be executed in a background also during MU communication preparation processing of step S502 and MU communication processing of steps S503 to S508. In this case, the monitoring result (determination result) indicating whether a legacy device exists around the AP 13 may be updated as needed.

Subsequently, the AP 13 starts the MU communication preparation processing (step S502). This processing will be described later as a first embodiment and a second embodiment below. Thereafter, the AP 13 starts the MU communication processing, thereby executing the MU communication in accordance with the specifications set by the 802.11ax standard. That is to say, first, in step S503, the communication analysis unit 402 determines whether the MU communication to be started is UL MU communication or DL MU communication. If the MU communication to be started is the UL MU communication (YES of step S503), the transmission/reception unit 401 transmits a Trigger frame and allocates an RU (Resource Unit) to each opposing STA in step S504. After the RU allocation, when the transmission/reception unit 401 receives a UL PPDU (data packet) from each STA (step S505), an MU ACK frame is transmitted to each STA as a confirmation response to the reception of the UL PPDU (step S506). Although FIG. 5 shows an example in which the AP 13 receives the UL PPDU from each STA, when the UL PPDU cannot be received, processing in which, for example, the confirmation response is not returned is executed.

On the other hand, if the MU communication to be started is the DL MU communication (NO of step S503), the transmission/reception unit 401 transmits a DL PPDU (data packet) to each opposing STA (step S507), and receives an ACK frame from each STA as a confirmation response (step S508). Although FIG. 5 shows an example in which the AP 13 receives the ACK frame in step S508, a situation in which the ACK frame cannot be received could possibly occur. Here, the DL PPDU is a downlink PPDU in multi-user communication, and is, for example, a DL HE MU PPDU (Downlink High efficiency Multi-user physical layer (PHY) protocol data unit).

Next, embodiments related to the MU communication preparation processing of step S502 of FIG. 5 will be described below.

First Embodiment

Figure 6:
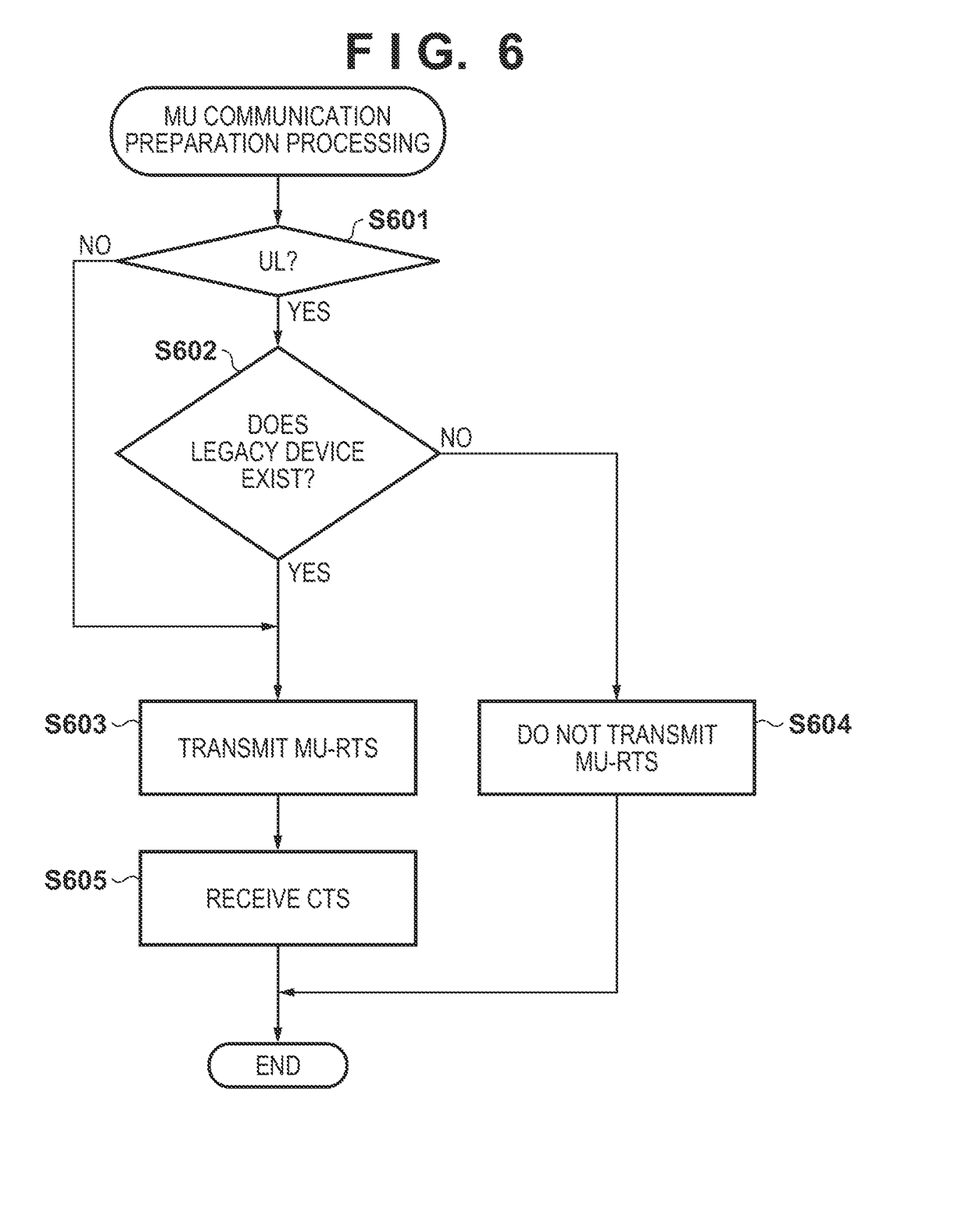
FIG. 6 shows an example of the flow of MU communication preparation processing that is executed by the AP in a first embodiment.

A description is now given of the MU communication preparation processing according to a first embodiment with reference to FIG. 6. FIG. 6 shows an example of the flow of the MU communication preparation processing that is executed by the AP 13 in the first embodiment. First, in step S601, the communication analysis unit 402 determines whether the MU communication to be started from now is a UL (uplink) or a DL (downlink). If the MU communication to be started is the UL (YES of step S601), the legacy device detection unit 403 determines whether a legacy device exists in step S602. This determination processing could be performed using the monitoring result of step S501 of FIG. 5. If it is determined that a legacy device exists (YES of step S602), the transmission/reception unit 401 transmits an MU-RTS frame in step S603, and ends the processing. If it is determined that no legacy device exists (NO of step S602), the AP 13 does not transmit the MU-RTS frame in step S604, and ends the processing. If it is determined that the MU communication to be started is the DL in step S601 (NO of step S601), the transmission/reception unit 401 transmits the MU-RTS frame in step S603. After the transmission of the MU-RTS frame, the transmission/reception unit 401 receives a CTS frame from the opposing STA in step S605, and ends the processing.

Note that when step S602 has resulted in YES, the AP 13 may determine whether the data size to be communicated through the MU communication is larger than a predetermined threshold, and the transmission/reception unit 401 may transmit the MU-RTS frame in step S603 if this data size is larger than this threshold. This data size is, for example, the size of a UL PPDU. Furthermore, when step S602 has resulted in YES, the transmission/reception unit 401 may transmit the CTS frame based on a CTS-to-self function and cause the legacy device (legacy STA 14) to set an NAV. In this case, the transmission/reception unit 401 may transmit the MU-RTS frame in step S603 if the error management unit 404 has determined that the MU communication is in the error state regardless of the transmission of the CTS frame based on the CTS-to-self function.

Figure 7:
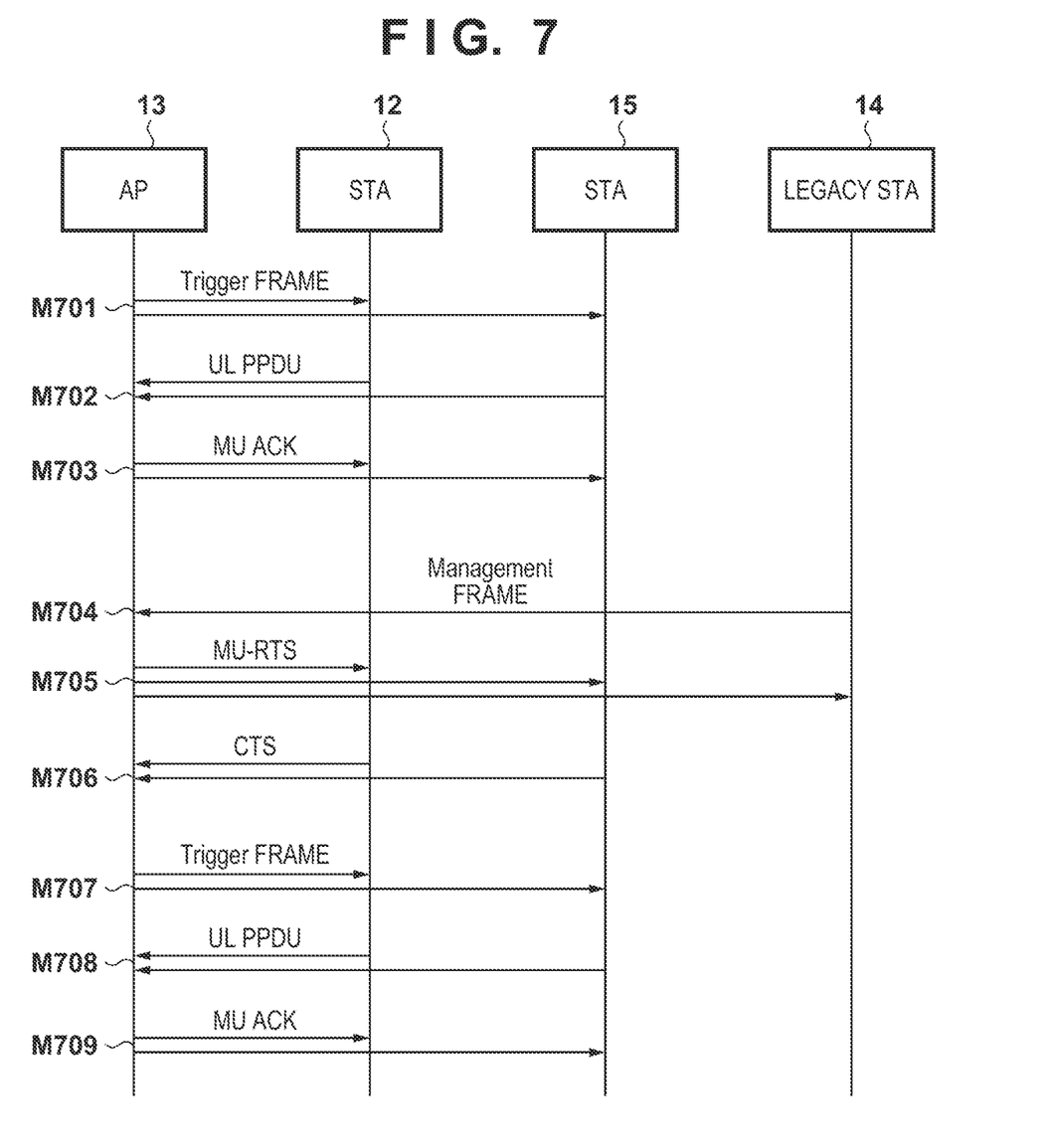
FIG. 7 shows an example of the flow of MU communication processing according to the first embodiment.

Next, a sequence of the UL MU communication in the present embodiment will be described using FIG. 7. FIG. 7 is a diagram showing an example of the flow of UL MU communication processing that is executed by the AP 13 in the present embodiment. It is assumed that the AP 13, STA 12, legacy STA 14, and STA 15 are respectively arranged as shown in FIG. 1. Note that the STA 11 and STA 19 are omitted from the present sequence diagram.

It is assumed that, at the start of the present sequence, the legacy device detection unit 403 of the AP 13 is in a state where it has not detected a legacy device (legacy STA 14). In starting the UL MU communication, the AP 13 goes through steps S501 and S502, and then starts the UL MU communication processing of steps S503 to S506 without transmitting an MU-RTS. In the UL MU communication processing, the AP 13 transmits a Trigger frame to the STA 12 and STA 15, with which the MU communication is to be performed, and allocates RUs (Resource Units) in M701 (step S504). Each of the STA 12 and STA 15 transmits a UL PPDU to the AP using the allocated RU in M702 (step S505). The AP 13, which has received the UL PPDUs, transmits an MU ACK frame to the STA 12 and STA 15 in M703 (step S506). In the state where no legacy device has been detected, due to the repeated execution of the processing of M701 to M703, the UL MU communication can be performed without an overhead attributed to the MU-RTS/CTS processing.

Now assume that the AP 13 receives a Management frame from the legacy STA 14 in M704. The AP 13 analyzes the Management frame in the monitoring processing of step S501. In this way, for example, the AP 13 can determine that the device that transmitted this frame is a legacy device because an HE Capabilities IE is not appended. Consequently, in the following UL MU communication, it is determined that a legacy device exists (YES of step S602), and the AP 13 transmits an MU-RTS frame in M705 (step S603). The STA 12 and STA 15, which have received the MU-RTS, transmit a CTS frame to the AP 13 in M706. The legacy STA 14 can receive the MU-RTS frame (it is assumed that the MU-RTS frame is in a format that can be demodulated by the legacy STA 14 in the present example), and using the value of a Duration Field included in this frame, set the duration of the MU communication until transmission/reception of an MU-ACK frame in M709 as an NAV period. As M707 to M709 are similar to M701 to M703, their descriptions are omitted. Although it is assumed that the legacy STA 14 can demodulate the MU-RTS frame in the example of FIG. 7, even if it cannot demodulate the MU-RTS frame, it can appropriately set an NAV, as stated earlier, when it can demodulate the CTS frames transmitted by the STA 12 and STA 15.

As described above, in the first embodiment, the AP transmits an MU-RTS frame if it is determined that a legacy device exists therearound, and does not transmit an MU-RTS frame if it is not determined as such. As this could enable the legacy device and a hidden terminal to receive an MU-RTS frame and a CTS frame, the possibility of the occurrence of signal collision can be suppressed, and the probability of success in the MU communication can be improved.

Second Embodiment

Figure 8:
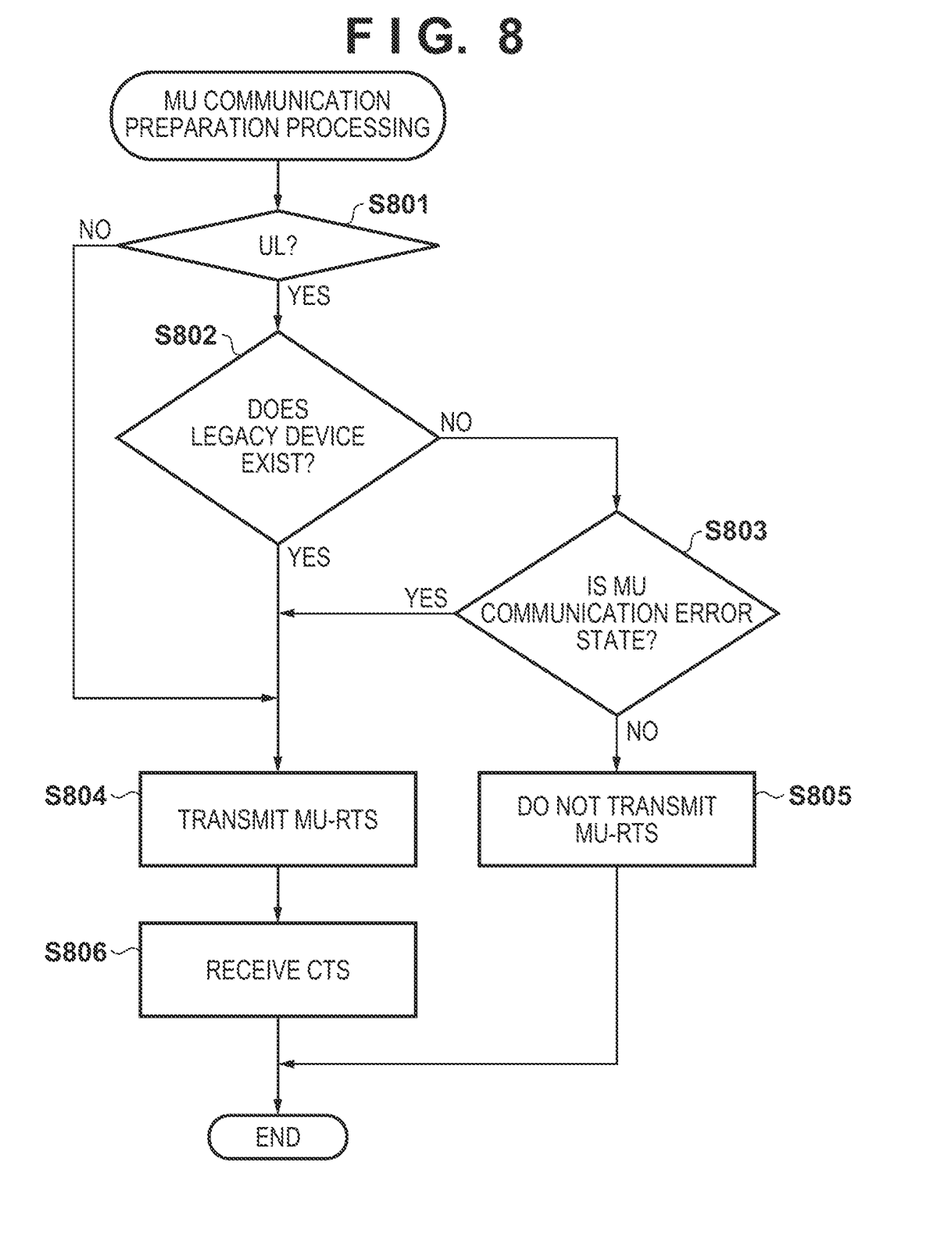
FIG. 8 shows an example of the flow of MU communication preparation processing that is executed by the AP in a second embodiment.

A description is now given of the MU communication preparation processing according to a second embodiment with reference to FIG. 8. FIG. 8 shows an example of the flow of the MU communication preparation processing that is executed by the AP 13 in the second embodiment. First, in step S801, the communication analysis unit 402 determines whether the MU communication to be started from now is a UL (uplink) or a DL (downlink). If the MU communication to be started is the UL (YES of step S801), the legacy device detection unit 403 determines whether a legacy device exists in step S802. This determination processing could be performed using the monitoring result of step S501 of FIG. 5. If it is determined that a legacy device exists (YES of step S802), the transmission/reception unit 401 transmits an MU-RTS frame in step S804; then, the transmission/reception unit 401 receives a CTS frame from the opposing STA in step S806, and ends the processing. If it is determined that no legacy device exists (NO of step S802), the error management unit 404 determines whether the MU communication is in an error state in step S803. This determination processing could be performed based on the number of errors or the number of consecutive errors in MU transmission, which is managed by the error management unit 404 on a per-STA basis. For example, the error management unit 404 can determine that the MU communication is in the error state when the number of consecutive errors with respect to an STA with which the MU UL communication is to be performed is n (e.g., n=3). Note that an error determination method is not limited to this; for example, a cumulative number of errors of m (e.g., m=10) may be used. If it is determined that the MU communication is in the error state in step S803 (YES of step S803), the transmission/reception unit 401 transmits an MU-RTS in step S804; then, the transmission/reception unit 401 receives a CTS frame from the opposing STA in step S806, and ends the processing. If it is not determined that the MU communication is in the error state in step S803 (NO of step S803), the AP 13 does not transmit the MU-RTS in step S805, and ends the processing. If it is determined that the MU communication to be started is the DL in step S801 (NO of step S801), the transmission/reception unit 401 transmits an MU-RTS frame in step S804, receives a CTS frame from the opposing STA in step S806, and ends the processing.

Note that when step S802 has resulted in YES, the AP 13 may determine whether the data size to be communicated through the MU communication is larger than a predetermined threshold, and the transmission/reception unit 401 may transmit the MU-RTS frame in step S804 if this data size is larger than this threshold. This data size is, for example, the size of a UL PPDU. Furthermore, when step S802 has resulted in YES, the transmission/reception unit 401 may transmit the CTS frame based on a CTS-to-self function and cause the legacy device (legacy STA 14) to set an NAV. In this case, the transmission/reception unit 401 may transmit the MU-RTS frame in step S804 if the error management unit 404 has determined that the MU communication is in the error state regardless of the transmission of the CTS frame based on the CTS-to-self function.

Figure 9:
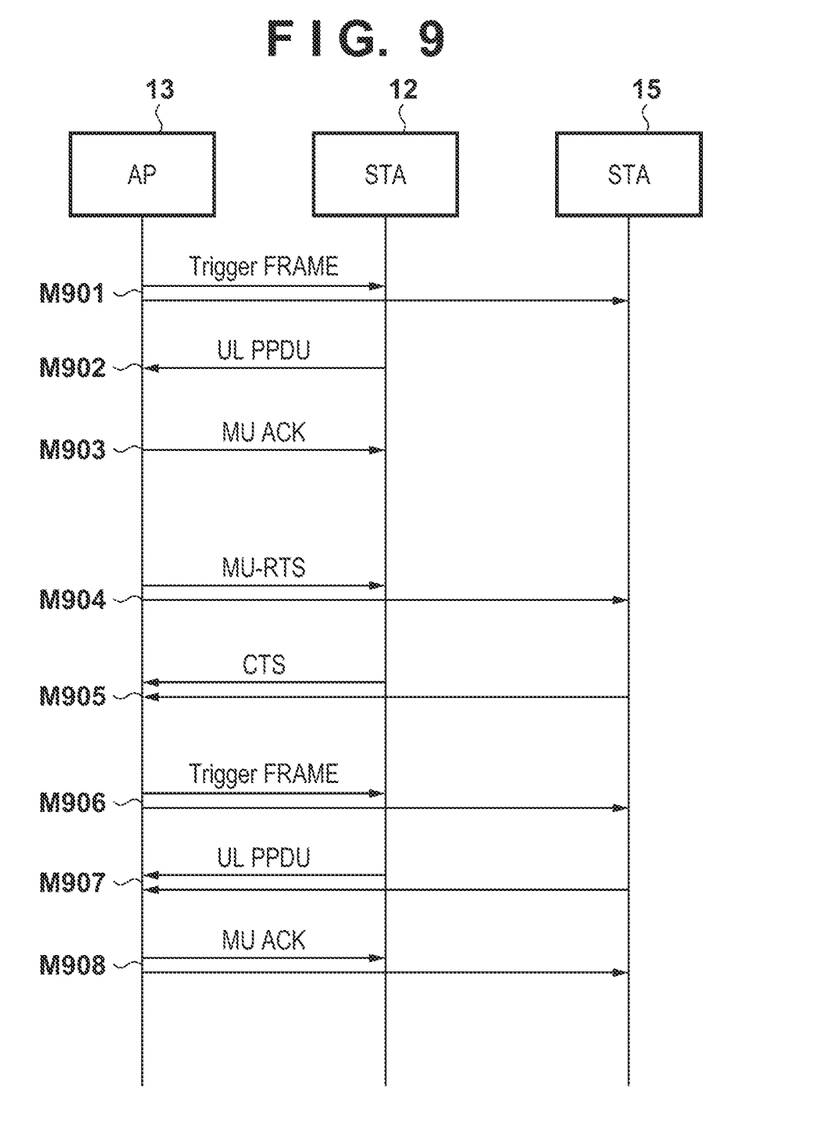
FIG. 9 shows an example of the flow of MU communication processing according to the second embodiment.

Next, a sequence of the UL MU communication in the present embodiment will be described using FIG. 9. FIG. 9 is a diagram showing an example of the flow of the UL MU communication processing that is executed by the AP 13 in the present embodiment. It is assumed that the AP 13, STA 12, and STA 15 are respectively arranged as shown in FIG. 1. Note that the STA 11, legacy STA 14, and STA 19 are omitted from the present sequence diagram.

It is assumed that, at the start of the present sequence, the legacy device detection unit 403 of the AP 13 is in a state where it has not detected a legacy device. In starting the UL MU communication, the AP 13 goes through steps S501 and S502, and then starts the UL MU communication processing of steps S503 to S506 without transmitting an MU-RTS. In the UL MU communication processing, the AP 13 transmits a Trigger frame to the STA 12 and STA 15, which are the MU targets, and allocates RUs in M901 (step S504). Each of the STA 12 and STA 15 attempts to transmit a UL PPDU to the AP 13 using the allocated RU in M902 (step S505).

Now assume a case where the UL PPDU from the STA 15 does not arrive at the AP 13. In this case, the AP 13 transmits an MU ACK frame only to the STA 12 in M903 (step S506). Here, the error management unit 404 of the AP 13 determines that the UL MU communication with the STA 15 has failed, and increments the number of errors with respect to the STA 15. Note that an error in the MU communication with the STA 15 could be determined based on whether the AP 13 has been able to receive a UL MU frame (e.g., a PPDU) from a target STA, and the case where the Trigger frame of M901 has not reached the STA 15 could also be processed as an error in a similar way. The error management unit 404 may manage one or both of the number of consecutive errors and the cumulative number of errors as the number of errors. The number of consecutive errors is reset to 0 when the UL PPDU from this STA has been received. Also, the cumulative number of errors may be the cumulative number within a certain period. In this case, when a certain period has elapsed since the occurrence of an error, the corresponding cumulative number may be decremented.

When the UL MU communication is in the state where no legacy device has been detected, due to the repeated execution of the processing of M901 to M903, the UL MU communication can be performed without an overhead attributed to the MU-RTS/CTS processing. Now assume a case where the error management unit 404 has been set to determine that the MU communication is in the error state in step S803 if the number of consecutive errors is three, and the processing of M901 to M903 have occurred three times consecutively. In this case, in the following UL MU communication, it is determined that the MU communication is in the error state in step S803 within step S502, and the AP 13 transmits an MU-RTS in M904 (step S804). The STA 12 and STA 15, which have received the MU-RTS frame, transmit a CTS frame to the AP 13 in M905. As M906 to M908 are similar to M701 to M703, their descriptions are omitted.

As described above, in the second embodiment, even when no legacy device exists around the AP, an MU-RTS is transmitted for the purpose of setting an NAV on a hidden terminal, which could exist past the opposing STAs, in a situation where the probability of success in the MU communication is low. This can suppress the possibility of the occurrence of signal collision, and improve the probability of success in the MU communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-188611, filed on Oct. 3, 2018 which is hereby incorporated by reference herein in its entirety.

What is claimed is:

1. A communication apparatus compatible with an IEEE 802.11ax standard that enables multi-user communication in which signals for one or more other communication apparatuses are multiplexed and transmitted, the communication apparatus comprising:
    a determination unit configured to, in a case where the multi-user communication is uplink communication, determine whether an incompatible apparatus exists around the communication apparatus, the incompatible apparatus being compatible with any of standards of an IEEE 802.11 series that precede the IEEE 802.11ax standard and incompatible with the IEEE802.11ax standard; and
    a transmission unit configured to, in a case where the determination unit has determined that the incompatible apparatus exists around the communication apparatus, transmit an MU-RTS (Multi User Request To Send) frame before data communication through the multi-user communication.

2. The communication apparatus according to claim 1, wherein
    in a case where the determination unit has not determined that the incompatible apparatus exists around the communication apparatus, the transmission unit does not transmit the MU-RTS frame.

3. The communication apparatus according to claim 1, further comprising
    an error management unit configured to determine whether the multi-user communication is in an error state,
    wherein even in a case where the determination unit has not determined that the incompatible apparatus exists around the communication apparatus, the transmission unit transmits the MU-RTS frame in a case where the error management unit has determined that the multi-user communication is in the error state.

4. The communication apparatus according to claim 3, wherein
    the error management unit determines that the multi-user communication is in the error state in a case where the number of errors exceeds a predetermined threshold, the number of errors being counted when a data packet transmitted from another apparatus to which the MU-RTS frame is to be transmitted has not been received.

5. The communication apparatus according to claim 4, wherein
the number of errors is the number of consecutive errors or the cumulative number of errors.

6. The communication apparatus according to claim 1, wherein
the determination unit determines whether the incompatible apparatus exists around the communication apparatus based on a received Management frame.

7. The communication apparatus according to claim 6, wherein
the determination unit determines that the incompatible apparatus exists around the communication apparatus in a case where the Management frame does not include an HE (High Efficiency) Capabilities Element.

8. The communication apparatus according to claim 1, wherein
in a case where the determination unit has determined that the incompatible apparatus exists around the communication apparatus, the determination unit further determines whether a data size communicated through the multi-user communication is larger than a predetermined threshold, and the transmission unit transmits the MU-RTS frame in a case where the determination unit has determined that the data size is larger than the predetermined threshold.

9. The communication apparatus according to claim 1, wherein
in a case where the determination unit has determined that the other apparatus exists around the communication apparatus, the transmission unit transmits the MU-RTS frame before transmitting a Trigger frame.

10. The communication apparatus according to claim 1, wherein
in a case where the multi-user communication is downlink communication, the transmission unit transmits the MU-RTS frame before the data communication through the multi-user communication.

11. A control method for a communication apparatus compatible with an IEEE 802.11ax standard that enables multi-user communication in which signals for one or more other communication apparatuses are multiplexed and transmitted, the control method comprising:
in a case where the multi-user communication is uplink communication, determining whether an incompatible apparatus exists around the communication apparatus, the incompatible apparatus being compatible with any of standards of an IEEE 802.11 series that precede the IEEE 802.11ax standard and incompatible with the IEEE802.11ax standard; and
in a case where it is determined that the incompatible apparatus exists around the communication apparatus in the determining, transmitting an MU-RTS (Multi User Request To Send) frame before data communication through the multi-user communication.

12. A non-transitory computer-readable storage medium storing a computer program for causing a computer to execute a control method for a communication apparatus compatible with an IEEE 802.11ax standard that enables multi-user communication in which signals for one or more other communication apparatuses are multiplexed and transmitted, the control method comprising:
in a case where the multi-user communication is uplink communication, determining whether an incompatible apparatus exists around the communication apparatus, the incompatible apparatus being compatible with any of standards of an IEEE 802.11 series that precede the IEEE 802.11ax standard and incompatible with the IEEE802.11ax standard; and
in a case where it is determined that the incompatible apparatus exists around the communication apparatus in the determining, transmitting an MU-RTS (Multi User Request To Send) frame before data communication through the multi-user communication.

* * * * *